United States Patent
Syrjarinne et al.

(10) Patent No.: US 8,624,778 B2
(45) Date of Patent: Jan. 7, 2014

(54) ASSISTED SATELLITE SIGNAL BASED POSITIONING

(75) Inventors: Jari Tapani Syrjarinne, Tampere (FI); Lauri Aarne Johannes Wirola, Tampere (FI)

(73) Assignee: Nokia Corporation, Espoo (FI)

(*) Notice: Subject to any disclaimer, the term of this patent is extended or adjusted under 35 U.S.C. 154(b) by 360 days.

(21) Appl. No.: 12/442,401

(22) PCT Filed: Jan. 23, 2007

(86) PCT No.: PCT/IB2007/050226
§ 371 (c)(1),
(2), (4) Date: Sep. 3, 2009

(87) PCT Pub. No.: WO2008/035233
PCT Pub. Date: Mar. 27, 2008

(65) Prior Publication Data
US 2010/0013705 A1    Jan. 21, 2010

(30) Foreign Application Priority Data
Sep. 21, 2006   (WO) .................. PCT/IB2006/053419

(51) Int. Cl.
*G01S 19/05* (2010.01)
*G01S 19/33* (2010.01)
(52) U.S. Cl.
USPC .............................. 342/357.42; 342/357.73
(58) Field of Classification Search
USPC .............. 342/357.42, 357.43, 357.64, 357.73
See application file for complete search history.

(56) References Cited

U.S. PATENT DOCUMENTS

| | | | |
|---|---|---|---|
| 5,731,786 A * | 3/1998 | Abraham et al. | 342/357.25 |
| 6,389,291 B1 | 5/2002 | Pande et al. | |
| 6,429,811 B1 | 8/2002 | Zhao et al. | |
| 6,861,980 B1 | 3/2005 | Rowitch et al. | |
| 7,242,348 B2 | 7/2007 | Nagahara | |
| 7,362,265 B2 | 4/2008 | Weill | |
| 7,688,260 B2 | 3/2010 | Pomerantz et al. | |
| 7,747,257 B2 * | 6/2010 | Zhao et al. | 455/456.1 |
| 7,768,449 B2 * | 8/2010 | Gaal et al. | 342/357.73 |
| 8,310,396 B2 * | 11/2012 | Syrjarinne et al. | 342/357.43 |
| 2002/0168985 A1 | 11/2002 | Zhao et al. | |
| 2002/0190898 A1 | 12/2002 | Abraham et al. | |
| 2003/0011513 A1 | 1/2003 | Zhao et al. | |
| 2003/0234738 A1 | 12/2003 | Orler et al. | |

(Continued)

FOREIGN PATENT DOCUMENTS

AU  2006339343 B2  9/2007
EP     1617231 A1  1/2006

(Continued)

OTHER PUBLICATIONS

"Navstar Global Positioning System Interface Specification IS-GPS-200" Revision D, Mar. 7, 2006.*

(Continued)

*Primary Examiner* — Cassie Galt
(74) *Attorney, Agent, or Firm* — Alston & Bird LLP

(57) ABSTRACT

A set of parameters for a plurality of satellites belonging to at least two different satellite systems is assembled. Further, a definition of a data structure is provided, the data structure including at least one section for parameters for a plurality of satellites belonging to at least two different satellite systems.

20 Claims, 7 Drawing Sheets

(56) References Cited

U.S. PATENT DOCUMENTS

| | | | | |
|---|---|---|---|---|
| 2004/0263386 | A1* | 12/2004 | King et al. | 342/357.06 |
| 2005/0090265 | A1 | 4/2005 | Abraham | |
| 2005/0114022 | A1 | 5/2005 | Podshivalov et al. | |
| 2006/0145917 | A1* | 7/2006 | Miyano et al. | 342/357.12 |
| 2006/0238418 | A1 | 10/2006 | Monnerat et al. | |

FOREIGN PATENT DOCUMENTS

| | | |
|---|---|---|
| JP | 2004519892 A | 7/2004 |
| JP | 2006029914 A | 2/2006 |
| RU | 2073913 C1 | 2/1997 |
| TW | I247131 | 1/2006 |
| TW | I260176 | 8/2006 |
| WO | 0184176 A1 | 11/2001 |
| WO | 02067462 A1 | 8/2002 |
| WO | 2004001439 A1 | 12/2003 |
| WO | 2005008273 A1 | 1/2005 |
| WO | 2005022189 A2 | 3/2005 |

OTHER PUBLICATIONS

Office Action received from Australian Patent Application No. 2006339343, dated May 24, 2010, 10 pages.
Office Action received from Chinese Patent Application No. 200680053513.2, dated Apr. 26, 2011, 20 pages.
3GPP TR 23.835, V. 1.0.0 (Jun. 2003), "3rd Generation Partnership Project; Technical Specification Group Services and System Aspects; Location Services (LCS); Study into Applicability of GALILEO in LCS, Release 6".
Extended Search Report received in European Patent Application No. 11165706.0, dated Jul. 29, 2011.
3GPP TS 044.35, V.8.3.0 (Jan. 2001), 3rd Generation Partnership Project; Technical Specification Group GSM EDGE Radio Access Network; Location Services (LCS); Broadcast Network Assistance for Enhanced Observed Time Difference (E-OTD) and Global Positioning System (gps) Positioning Methods (release 1999).
Office Action received from Korean Application No. 2008-7023201, dated Aug. 31, 2010, 6 pages.
Office Action received from Mexican Application No. MX/a/2008/011033, dated Oct. 28, 2010, 3 pages.
Office Action received from Russian Application No. 2008138467/09, dated May 19, 2009, 8 pages.
International Search Report and Written Opinion of the International Searching Authority for PCT Application No. PCT/FI2006/050084 dated Sep. 11, 2006, 10 pages.
Office Action received from U.S. Appl. No. 11/574,485, dated Oct. 25, 2010, 10 pages.
Office Action received from U.S. Appl. No. 11/574,485, dated Apr. 30, 2010, 10 pages.
Office Action received from European Application No. 06809372.3, dated Sep. 7, 2009, 4 pages.
Office Action received from European Application No. 07700667.4, dated Nov. 18, 2009, 5 pages.
Office Action received from European Application No. 06809372.3, dated Apr. 30, 2010, 4 pages.
European Space Agency ESA, "Specification of Galileo and Giove Space Segment Properties Relevant for Satellite Laser Ranging", Jul. 7, 2006.
Office Action received from Japanese Application No. 2008-556803, dated Aug. 1, 2011, 11 pages.
Extended Search Report received in European Patent Application No. 06708988.8, dated Dec. 17, 2009.
Office Action received from Chinese Patent Application No. 200680056432.8, dated Jun. 2, 2011, 13 pages.
International Search Report and Written Opinion of the International Searching Authority for PCT Application No. PCT/IB2007/050226 dated Jun. 25, 2007 (Corrected), 16 pages.
Monnerat, et al., "The Assisted GNSS, Technology and Applications", ION GNSS International Technical Meeting of the Satellite Division of the Institute of Navigation, Washington, DC, Sep. 21, 2004, pp. 2479-2488.
Schmidt et al., "Combined Galileo/GPS Architecture for Enhanced Sensitivity Reception", AEU International Journal of Electronics and Communications, Elsevier, Jena, DE, vol. 59, No. 5, Jul. 15, 2005, pp. 297-306.
International Search Report and Written Opinion of the International Searching Authority for PCT Application No. PCT/IB2007/053419 dated Jun. 1, 2007, 9 pages.
Office Action received in corresponding Canadian Application No. 2,663,603, dated Aug. 8, 2011, 2 Pages.
3rd Generation Partnership Project (3GPP), Technical Specification Group GSM/EDGE Radio Access Network 2 (TSG-GERAN2) Meeting No. 32 (Tdoc GP-062407), Nov. 13-17, 2006, 54 pages, Sophia Antipolis, France.
"Galileo Open Service—Signal in Space interface Control Document," *European Space Agency/Galileo Joint Undertaking*, May 23, 2006, 192 pages.
"Global Navigation Satellite System—Interface Control Document," *Coordinated Scientific Information Center*, 2002, 51 pages.
"Naystart GPS Space Segment/User Segment L2C Interfaces," *Navstar Global Positioning System*, GPS Joint Program Office, Apr. 19, 2006.
Leonard, et al., "GPS and Galileo Interoperability and Synergies," *Proceedings of the 15th International Technical Meeting of the Satellite Division of the Institute of Navigation*, Sep. 24-27, pp. 330-341.
"3rd Generation Partnership Project," ETSI Standards, European Telecommunications Standards Institute, Jun. 2003, No. V100, Section 5.6-6.3, Sophia Antipo, France.
International Search Report and Written Opinion of International Searching Authority mailed Jun. 1, 2007, for application No. PCT/IB2006/053419.
United States Patent and Trademark Office, Office Action for U.S. Appl. No. 12/442,400, mailed Mar. 8, 2012, 20 pages, USA.
Intellectual Property Office, Ministry of Economic Affairs, R.O.C., Taiwan Office Action for Application No. 096134861, Jun. 5, 2013, 6 pages, Republic of China.

* cited by examiner

| Field | Bits | Scale 2^ | Units |
|---|---|---|---|
| Week | 8 | 0 | weeks |

} Common part almanac parameters for plurality of Galileo and GLONASS satellites

| Field | Bits | Scale 2^ | Units |
|---|---|---|---|
| Toa | 8 | 12 | s |
| IODa | 2 | 0 | - |

} Common part almanac parameters for plurality of Galileo satellites

| Field | Bits | Scale 2^ | Units |
|---|---|---|---|
| e | 11 | -16 | - |
| delta_i | 11 | -14 | sc |
| Omegadot | 11 | -33 | sc/s |
| delta_sqrtA | 17 | -9 | m^½ |
| Omega0 | 16 | -15 | sc |
| omega | 16 | -15 | sc |
| M0 | 16 | -15 | sc |
| SVstatus | 2/4 | - | - |
| af0 | 14 | -19 | s |
| af1 | 11 | -38 | s/s |

} Individual part almanac parameters for each Galileo satellite

| Field | Bits | Scale 2^ | Units |
|---|---|---|---|
| - | - | - | - |

} Common part almanac parameters for plurality of GLONASS satellites

| Field | Bits | Scale 2^ | Units |
|---|---|---|---|
| Day | 3 | 0 | days |
| Toa | 21 | -5 | s |
| e | 15 | -20 | - |
| delta_i | 18 | -20 | sc |
| Omega0 | 21 | -20 | sc |
| omega | 16 | -15 | sc |
| delta_T | 22 | -9 | s/orbit |
| delta_Tdot | 7 | -14 | s/orbit^2 |
| Cn (health) | 1 | - | - |
| Tau_n | 10 | -18 | s |

} Individual part almanac parameters for each GLONASS satellite

ASSISTED SATELLITE SIGNAL BASED POSITIONING

RELATED APPLICATION

This application was originally filed as PCT Application No. PCT/IB2007/050226 filed Jan. 23, 2007, which claims priority to PCT Application No. PCT/IB2006/053419 filed Sep. 21, 2006.

FIELD OF THE INVENTION

The invention relates to assisted satellite signal based positioning.

BACKGROUND OF THE INVENTION

A positioning of a device is supported by various Global Navigation Satellite Systems (GNSS). These include for example the American Global Positioning System (GPS), the Russian Global Navigation Satellite System (GLONASS), the future European system Galileo, the Space Based Augmentation Systems (SBAS), the Japanese GPS augmentation Quasi-Zenith Satellite System (QZSS), the Locals Area Augmentation Systems (LAAS), and hybrid systems.

A GNSS usually comprises a plurality of satellites that orbit the earth. The satellites are also referred to as space vehicles (SV). Each of the satellites transmits at least one carrier signal, which may be the same for all satellites. Each carrier signal may then be modulated by a different pseudo random noise (PRN) code, which spreads the signal in the spectrum. As a result, different channels are obtained for the transmission by different satellites. The code comprises a number of bits, which is repeated in cycles. The bits of the PRN code are referred to as chips and the time of a cycle is referred to as the epoch of the code. The carrier frequency of the signal is further modulated with navigation information at a bit rate that is significantly lower than the chip rate of the PRN code.

The navigation information may comprise among other information a satellite identifier (SV ID), orbital parameters and time parameters. The satellite identifier indicates the satellite for which data in the navigation information can be applied. It may be for instance an ordinal number. The orbital parameters may include ephemeris parameters and almanac parameters. Ephemeris parameters describe short sections of the orbit of the respective satellite. They may comprise for example a parameter indicating the semi-major axis and the eccentricity of the ellipse along which the satellite currently travels. Based on the ephemeris parameters, an algorithm can estimate the position of the satellite for any time while the satellite is located in the described section of the orbit. The almanac parameters are similar, but coarser orbit parameters, which are valid for a longer time than the ephemeris parameters. It might be noted that in the case of almanac, all satellites send the almanac parameters for all satellites of the system, including an SV ID indicating to which the respective almanac parameters belong. The time parameters define clock models that relate the satellite time to the system time of the GNSS and the system time to the Coordinated Universal Time (UTC). Further, they include a time-of-ephemeris (TOE) parameter indicating the reference time for ephemeris, and a time-of-clock-model (TOC) parameter indicating the reference time for the clock model.

In the case of GLONASS, the terms "immediate information" and "non-immediate information" are used instead of the terms "ephemeris" and "almanac". It is to be understood that any reference in this document to "ephemeris" and "almanac" is used to denote all possible terms that may be used for the same kind of information, including GLONASS "immediate information" and "non-immediate information".

A GNSS receiver, of which position is to be determined, receives the signals transmitted by the currently available satellites, and it acquires and tracks the channels used by different satellites based on the different comprised PRN codes. Then, the receiver determines the time of transmission of the code transmitted by each satellite, usually based on data in the decoded navigation messages and on counts of epochs and chips of the PRN codes. The time of transmission and the measured time of arrival of a signal at the receiver allow determining the pseudorange between the satellite and the receiver. The term pseudorange denotes the geometric distance between the satellite and the receiver, which distance is biased by unknown satellite and receiver offsets from the GNSS time.

In one possible solution scheme, the offset between the satellite and system clocks is assumed to be known and the problem reduces to solving a non-linear set of equations of four unknowns, namely three receiver position coordinates and the offset between the receiver and GNSS system clocks. Therefore, at least four measurements are required in order to be able to solve the set of equations. The outcome of the process is the receiver position.

In some environments, a GNSS receiver may be able to acquire and track sufficient satellite signals for a positioning based on the PRN codes, but the quality of the signals may not be sufficiently high for decoding the navigation messages. This may be the case, for instance, in indoor environments. Further, the decoding of navigation messages requires a significant amount of processing power, which may be limited in a mobile GNSS receiver.

If the GNSS receiver is included in a cellular terminal or attached as an accessory device to a cellular terminal, a cellular network may therefore be able to provide the cellular terminal via a cellular link with assistance data including parameters extracted from decoded navigation messages. Such a supported GNSS based positioning is referred to as assisted GNSS (AGNSS). The received information enables the GNSS receiver or the associated cellular terminal to obtain a position fix in a shorter time and in more challenging signal conditions. Assistance data is typically provided for each satellite that is visible to the GNSS receiver associated to the cellular terminal. The assistance data may comprise navigation model parameters, which usually include orbit parameters, TOE and TOC parameters and SV ID parameters.

Moreover, an external service may provide long-term orbits, which are accurate substantially longer than the orbit models (ephemeris/almanac) in the SV broadcasts.

SUMMARY

A method is described, which comprises assembling a set of parameters for a plurality of satellites belonging to at least two different satellite systems.

The method may further comprise including in the set of parameters a satellite index for each satellite of the plurality of satellites and/or an identifier of an employed data structure for each satellite of the plurality of satellites.

The method may further comprise including in the set of parameters a common part for at least one parameter, wherein the common part is valid for each of the satellites belonging to at least two different satellite systems. A common part, which is valid for each of the satellites belonging to at least two different satellite systems, may comprise for example a week count.

The method may further comprise for at least one of the at least two satellite systems including in the set of parameters a common part for at least one parameter, wherein the common part is valid only for each of the satellites belonging to a respective one of the at least one satellite system. A common part, which is valid for each of the satellites belonging to a respective one of the at least one satellite systems, may comprise for example a time-of-week and/or a day count.

The method may further comprise for each of the satellites of at least two different satellite systems including in the set of parameters a respective individual part for at least one parameter, wherein the individual part is valid only for a respective one of the satellites. An individual part, which is valid only for a respective one of the satellites of at least two different satellite systems, could comprise for instance at least one of: almanac data for the satellite; non-immediate information for the satellite; a day count; and a time of day.

The method may further comprise providing the set of parameters as assistance data for a satellite signal based positioning. The assistance data may be provided for example via a wireless link to a wireless terminal, to which a satellite signal receiver is associated.

Moreover, an apparatus is described, which comprises a processing component. The processing component is configured to assemble a set of parameters for a plurality of satellites belonging to at least two different satellite systems.

The processing component of the apparatus can be implemented in hardware and/or software. It may be for instance a processor executing software program code for realizing the required functions. Alternatively, it could be for instance a circuit that is designed to realize the required functions, for instance implemented in a chipset or a chip, like an integrated circuit.

The apparatus can be for example identical to the comprised processing component, but it may also comprise additional components. The apparatus could further be for example a module provided for integration into a standalone device or an accessory device.

The processing component may further be configured to include in the set of parameters at least one of: a satellite index for each satellite of the plurality of satellites; and an identifier of an employed data structure for each satellite of the plurality of satellites.

The processing component may further be configured to include in the set of parameters a common part for at least one parameter, wherein the common part is valid for each of the satellites belonging to at least two different satellite systems. The processing component may further be configured to include in the common part, which is valid for each of the satellites belonging to at least two different satellite systems, a week count.

The processing component may further be configured to include in the set of parameters a common part for at least one parameter, wherein the common part is valid only for each of the satellites belonging to a respective one of the at least one satellite system. In this case, the processing component may further be configured to include in the common part, which is valid for each of the satellites belonging to a respective one of the at least one satellite systems, a time-of-week and/or a day count.

The processing component may be configured to include in the set of parameters for each of the satellites of at least two different satellite systems a respective individual part for at least one parameter, wherein the individual part is valid only for a respective one of the satellites. In this case, the processing component may further be configured to include in an individual part, which is valid only for a respective one of the satellites of at least two different satellite systems, at least one of: almanac data for the satellite; non-immediate information for the satellite; a day count; and a time of day.

The processing component may further be configured to provide the set of parameters as assistance data for a satellite signal based positioning. In this case, the processing component may further be configured to provide the assistance data for transmission via a wireless link to a wireless terminal, to which a satellite signal receiver is associated.

Moreover, an electronic device is described, which comprises the described apparatus and a wireless communication component configured to transmit information via a wireless link.

Moreover, an electronic device is described, which comprises the described apparatus and a satellite signal receiver.

Moreover, a system is described, which comprises the described apparatus and an apparatus configured to use an assembled set of parameters in satellite based positioning calculations.

Moreover, a computer program code is described, which is adapted to realize the described method when executed by a processor.

Moreover, a computer program product is presented, in which such a computer program code is stored in a computer readable medium.

Moreover, an apparatus is described, which comprises means for assembling a set of parameters for a plurality of satellites belonging to at least two different satellite systems.

Moreover, a method is described, which comprises providing a definition of a data structure. The data structure includes at least one section for parameters for a plurality of satellites belonging to at least two different satellite systems. The at least one section may include for example at least one of: a common section for a common part for parameters for a plurality of satellites belonging to at least two different satellite systems; for at least one of the at least two different satellite systems a common section for a common part for parameters for satellites belonging to a respective one of the at least two different satellite systems; and for each of a plurality of satellites belonging to the at least two different satellite systems an individual part for parameters for a respective satellite.

Moreover, a data structure is described, which includes at least one section for parameters for a plurality of satellites belonging to at least two different satellite systems. The at least one section may comprise for example at least one of: a common section for a common part for parameters for a plurality of satellites belonging to at least two different satellite systems; for at least one of the at least two different satellite systems a common section for a common part for parameters for satellites belonging to a respective one of the at least two different satellite systems; and for each of a plurality of satellites belonging to the at least two different satellite systems an individual part for parameters for a respective satellite.

Moreover, a computer program code is described, in which a definition of the data structure is integrated.

Moreover, a computer program product is described, in which a definition of the data structure is stored in a computer readable medium.

Finally, an apparatus is described, which comprises such a computer program product.

It is to be understood that all described exemplary embodiments may also be used in any suitable combination.

In the following, other aspects of the invention will be presented, which may be used alone or in any combination with the above described embodiments:

For providing assistance data, the parameters in the navigation information may be copied in their original format to the assistance message. The bandwidth that is required for the transmission of such assistance messages is rather large, though, while in some wireless communications, like cellular communications, bandwidth is a critical factor.

For a first considered aspect, a method is proposed, which comprises receiving parameters for at least one satellite. The method further comprises removing redundant information from the parameters at large and providing parameters with reduced redundancy as assistance data for a satellite signal based positioning.

For the considered first aspect, moreover an apparatus is proposed, which comprises a processing component. The processing component is configured to receive parameters for at least one satellite. The processing component is further configured to remove redundant information from the parameters at large. The processing component is further configured to provide parameters with reduced redundancy as assistance data for a satellite signal based positioning.

The processing component of the apparatus proposed for the first considered aspect can be implemented in hardware and/or software. It may be for instance a processor executing software program code for realizing the required functions. Alternatively, it could be for instance a circuit that is designed to realize the required functions, for instance implemented in a chipset or a chip, like an integrated circuit.

The apparatus proposed for the first considered aspect can be for example identical to the comprised processing component, but it may also comprise additional components. The apparatus could further be for example a module provided for integration into a standalone device or an accessory device.

For the first considered aspect, moreover an electronic device is proposed, which comprises the apparatus proposed for the first considered aspect. In addition, it may comprise a wireless communication component configured to transmit information via a wireless link and/or a satellite signal receiver. The electronic device could be for example a network element of a wireless communication network, like a base station of a cellular communication network, a local measurement unit connected to such a network element or a server connected to such a wireless communication network.

For the first considered aspect, moreover a computer program product is proposed, in which a computer program code is stored in a computer readable medium. When executed by a processor, the computer program code realizes the method proposed for the first considered aspect. This computer program product may be for instance a separate memory device or a component that is to be integrated in a larger device.

The invention is to be understood to cover such a computer program code also independently from a computer program product and a computer readable medium.

For a second considered aspect, a method is proposed, which comprises receiving parameters as assistance data for a satellite signal based positioning, wherein the received parameters are based on original parameters for at least one satellite, from which original parameters at large redundant information has been removed. The method further comprises reconstructing the original parameters by adding the removed redundant information to the received parameters. The method further comprises using the reconstructed original parameters in an assisted satellite signal based positioning.

For a second considered aspect, moreover an apparatus is proposed, which comprises a processing component. The processing component is configured to receive parameters as assistance data for a satellite signal based positioning, wherein the received parameters are based on original parameters for at least one satellite, from which original parameters at large redundant information has been removed. The processing component is further configured to reconstruct the original parameters by adding the removed redundant information to the received parameters. The processing component is further configured to use the reconstructed original parameters in an assisted satellite signal based positioning.

Also the processing component of the apparatus proposed for the second considered aspect can be implemented in hardware and/or software. It may be for instance a processor executing software program code for realizing the required functions. Alternatively, it could be for instance a circuit that is designed to realize the required functions, for instance implemented in a chipset or a chip, like an integrated circuit.

Further, also the apparatus proposed for the second considered aspect can be for example identical to the comprised processing component, but it may also comprise additional components. The apparatus could further be for example a module provided for integration into a standalone device or an accessory device.

For the second considered aspect, moreover an electronic device is proposed, which comprises the apparatus proposed for the second considered aspect. In addition, it may comprise a wireless communication component configured to receive information via a wireless link and/or a satellite signal receiver. The electronic device could be for example a terminal of a wireless communication system, like a cellular terminal, or an accessory for such a terminal.

For the second considered aspect, moreover a computer program product is proposed, in which a computer program code is stored in a computer readable medium. When being executed by a processor, the computer program code realizes the method proposed for the second considered aspect. This computer program product may be for instance a separate memory device or a component that is to be integrated in a larger device.

The invention is to be understood to cover such a computer program code also independently from a computer program product and a computer readable medium.

Finally, a system is proposed, which comprises the apparatus proposed for the first considered aspect and the apparatus proposed for the second considered aspect.

The invention is based on the consideration that, on the one hand, the original formats of the parameters conveyed in particular though not exclusively in satellite signals necessarily have some redundancy, which is required by the type of transfer path. In satellite broadcasts, there may be periodical outages etc., and it may not always be possible at a satellite receiver to collect all data bits. The redundancy may be due for instance to a large amount of overhead data, which is provided for error correction, etc. On the other hand, a link that is used for providing assistance data can be more reliable, and bit errors can be prevented so that the overhead is not required. Moreover, corresponding parameters transmitted in parallel for different satellites may be quite similar to each other. If parameters for several satellites are thus to be provided as assistance data to a single device, a set of corresponding parameters may also comprise redundancy. It is therefore proposed that redundancy is removed from the parameters in their original format. It is to be understood that redundancy is removed from the parameters at large; some parameters in the assistance data may thus remain unchanged.

The invention results thus in a reduction of the bit consumption that is used for assistance data for an assisted satellite base positioning. The achieved bandwidth saving is valuable, for example, in cellular transmissions. The bit count that is required for certain parameters may be reduced without losing precision or compatibility with the original format, which is used by a respective satellite system.

The original parameters can be extracted from one or more satellite signal. As indicated above for the case of almanac, a single satellite may also transmit parameters for several satellites. Alternatively or in addition parameters may be received from another source, like a server providing long-term orbits. In this case, the parameters may be provided for instance using internet protocol (IP) based methods (user plane) or in a control plane.

There are different options for removing redundancy from the parameters, which depend on the respective kind of parameters. A reduction may be achieved for a parameter considered by itself, but in particular by a combined consideration of a group of corresponding parameters.

In one embodiment, removing redundant information from the parameters at large comprises determining a common part and a respective individual part for a plurality of parameters. The common part may then be provided only once for the plurality of parameters as assistance data.

In case the parameters comprise parameters for satellites belonging to two or more different satellite systems, a common part could even be determined for parameters for satellites belonging to different satellite systems. A respective common part for parameters for satellites belonging to a single satellite system could then be determined in addition.

At a device, which receives such assistance data, the original parameters may be reconstructed by adding the common part or parts received in the assistance data for a plurality of original parameters to a respective individual part received in the assistance data for a plurality of original parameters.

This approach is suited for different kinds of parameters. It can be used for example for a plurality of eccentricity parameters and/or for a plurality of semi-major axis parameters and/or for a plurality of time parameters indicating a respective point in time. These parameters can originate from ephemeris parameters, almanac parameters or even some external source, such as a commercial long-term orbit service. In assistance data, orbit parameters are typically sent for each satellite that is visible to the assisted device. Hence, any reduction in the bit count of the navigation model directly contributes to the bandwidth requirements.

If a common part can be used for parameters or groups of parameters for different satellite systems, the invention is also suited for harmonizing the representations across the systems considered.

In case the parameters comprise for example a respective eccentricity parameter for a plurality of satellites, removing redundant information from the parameters at large may comprise splitting up the plurality of eccentricity parameters into a common most significant bit (MSB) part and a respective individual least significant bit (LSB) part. The common MSB part may then be provided only once for the plurality of eccentricity parameters as assistance data. The individual LSB parts, in contrast, may be transmitted separately for each eccentricity parameter.

In case the parameters comprise a respective semi-major axis parameter for a plurality of satellites, removing redundant information from the parameters at large may comprise splitting up the plurality of semi-major axis parameters into a common MSB part and a respective individual LSB part. The common MSB part may then be provided only once for the plurality of semi-major axis parameters as assistance data. The individual LSB parts, in contrast, may be transmitted separately for each semi-major axis parameter.

As mentioned above, the presented embodiments for reducing redundancy in eccentricity and semi-major axis parameters can be used for ephemeris, almanac and any other source providing comparable parameters.

In case the parameters comprise a plurality of time parameters indicating a respective point in time, removing redundant information from the parameters at large may comprise determining for the plurality of time parameters a common part indicating a fixed time in a time block and an individual part defining a deviation of the point in time indicated by a respective time parameter from this fixed time. The common part may then be provided only once for the plurality of time parameters as assistance data. The individual parts, in contrast may be transmitted separately for each time parameter.

Such time parameters, for which a common part is defined, may comprise TOE parameters for a plurality of satellites or TOC parameters for a plurality of satellites. In case separate TOE and TOC parameters are available for a satellite, both the TOE and TOC parameters may also define a similar point in time. Thus, the approach can also be used for TOE parameter and TOC parameter for a respective single satellite. Most efficiently, a common part is determined for all TOE parameters and all TOC parameters for all considered satellites of one satellite system or even for all considered satellites of several satellite systems.

If the parameters comprise a respective satellite identification parameter for a plurality of satellites, the satellite identification parameters may be bit representations of ordinal numbers. In this case, redundant information may be reduced from the parameters at large by converting the plurality of bit representations of the ordinal numbers into a single bit mask representation of the ordinal numbers. The efficiency of this approach is increased with an increasing number of considered satellites. Actually, there might be a preceding decision step, which ensures that this approach is used only, in case a predetermined number of considered satellites is exceeded, in order to avoid a possible increase of data in the case of few considered satellites.

At a device, which receives such assistance data, the original satellite identification parameters may be reconstructed by converting a single bit mask representation of ordinal numbers into a plurality of bit representations of ordinal numbers, the bit representations of ordinal numbers corresponding to the original satellite identification parameters.

In some satellite systems, the satellite identification parameters comprise an offset. That is, more bits are used for representing a satellite identification than needed for differentiating between all possible satellites.

In this case, removing redundant information from the parameters at large may comprise reducing a bit count of a respective satellite identification parameter by removing a predetermined offset in the parameter. This approach may be used as an alternative or in addition to a conversion into a bit mask as proposed above.

At a device, which receives such assistance data, the original parameters may be reconstructed by converting received satellite identification parameters of less bits in the assistance data into original satellite identification parameters of more bits by adding a predetermined offset. If a bit mask has been used in addition, the bit mask is first converted into a plurality of bit representations, and the offset is then added to these bit representations for regaining the original parameters.

Also the presented embodiments for reducing redundancy in satellite identification parameters can be used for ephemeris, almanac and any other source providing comparable parameters.

Almanac parameters comprise parameters defining a section of the orbit and in addition a reference time.

In case the parameters comprise almanac parameters for a plurality of satellites, the almanac parameters may include almanac reference time information for each of the satellites. Also in this case, redundant information may be removed from the parameters at large by defining a common part including at least a part of the reference time information. The common part may then be provided only once for the plurality of satellites as assistance data. Depending on the concerned satellite system, the common part may comprise for example a week count, some other rough time indication, or the entire reference time indication. Any reference time indication may be used in its original format or in a modified format that may be better suited for a split-up.

In case the parameters comprise almanac parameters for a plurality of satellites belonging to at least two satellite systems, redundant information may be removed from the parameters at large for instance by determining for the almanac parameters a common part for a week count for a plurality of satellites belonging to different satellite systems. In addition, a common part may be provided for a time-of-week for a plurality of satellites belonging to the same satellite system and an individual part for almanac data for each of the plurality of satellites belonging to this satellite system. This first option may be selected for one or more of the considered satellite systems. Alternatively or in addition, a common part may be provided for a day count for a plurality of satellites belonging to the same satellite system and an individual part may be provided for a time of day and for almanac data for each of the plurality of satellites belonging to the same satellite system. Alternatively or in addition, an individual part may be provided for a day count, a time of day and almanac data for each of a plurality of satellites belonging to the same satellite system. The latter options may equally be selected for one or more of the considered satellite systems. Each common part is then provided only once for the almanac parameters as assistance data.

The assistance data can be transmitted for example via a cellular link to a cellular terminal, to which a satellite signal receiver is associated. Alternatively, though, it could be transmitted to any device needing the assistance data using any type of data link.

The invention can be used for any kind of current and future AGNSS, including but not limited to assisted GPS L5, Galileo, GLONASS, QZSS, LAAS or SBAS, or a combination of these. Possible SBASs comprise for example the Wide Area Augmentation System (WAAS) or the European Geostationary Navigation Overlay Service (EGNOS).

It is to be understood that all presented exemplary embodiments may also be used in any suitable combination.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

BRIEF DESCRIPTION OF THE FIGURES

FIG. 5 is an arrangement of tables illustrating an exemplary redundancy reduction in almanac parameters in the system of FIG. 1;

DETAILED DESCRIPTION OF THE INVENTION

Figure 1:
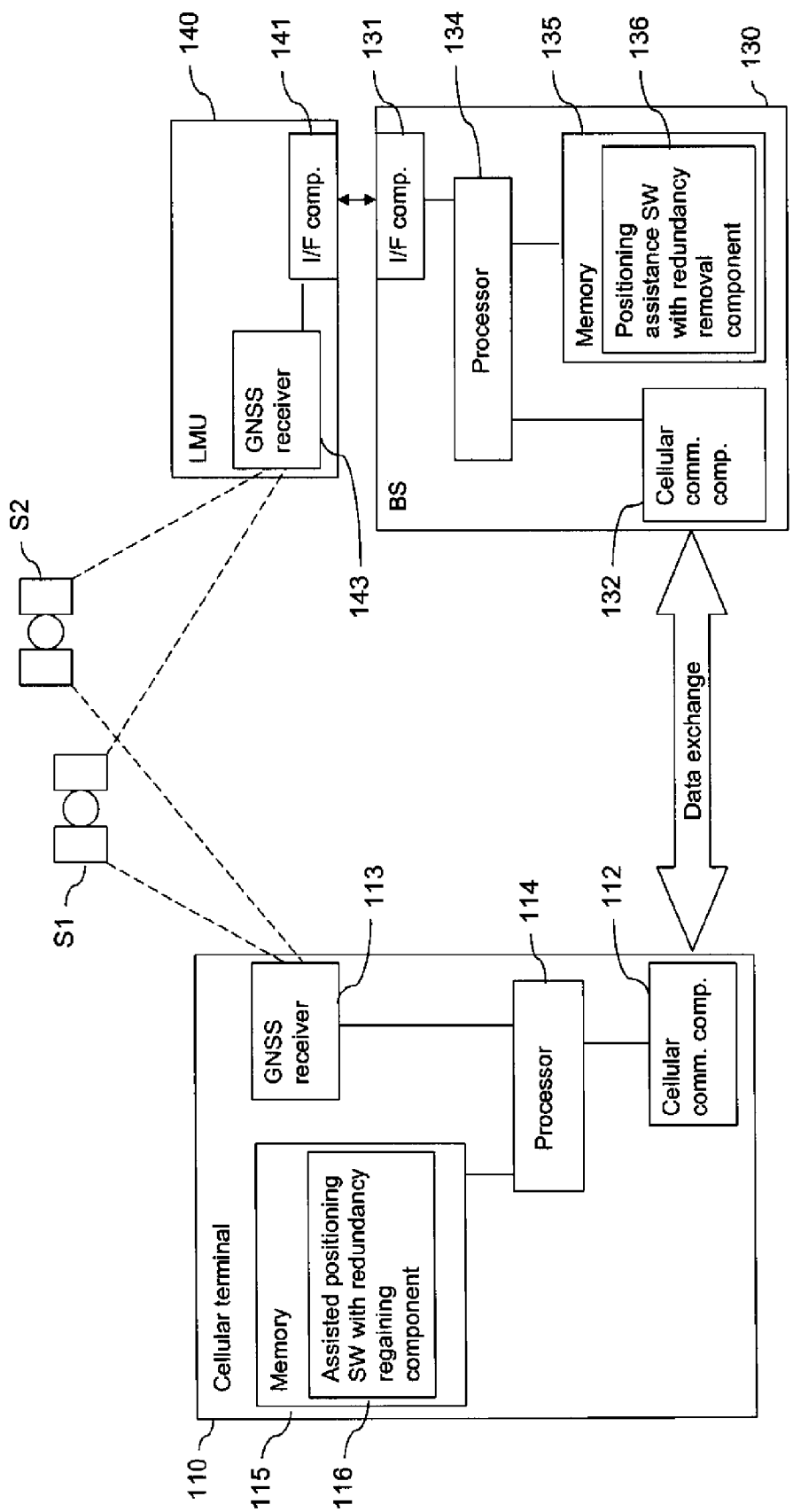
FIG. 1 is a schematic diagram of a first system according to an embodiment of the invention.

FIG. 1 presents an exemplary system according to the invention, which allows using a reduced bandwidth for transferring assistance data for an AGNSS based positioning via a cellular link.

The system comprises a cellular terminal 110, a base station 130 of a cellular communication network and a local measurement unit (LMU) 140.

The cellular terminal 110 can be a cellular phone or any other type of cellular terminal, like a laptop. It comprises a processor 114 and, linked to this processor 114, a cellular communication component 112, a GNSS receiver 113 and a memory 115.

The processor 114 is configured to execute computer program code. The memory 115 stores computer program code, which may be retrieved by the processor 114 for execution. The stored computer program code includes assisted positioning software (SW) 116.

The base station 130 includes a processor 134 and, linked to this processor 134, a cellular communication component 132, a memory 136 and an interface (I/F) component 131.

The processor 134 is configured to execute computer program code. The memory 135 stores computer program code, which may be retrieved by the processor 134 for execution. The stored computer program code includes positioning assistance software (SW) 136.

The LMU 140 comprises an interface component 141 and, linked to this interface component 141, a GNSS receiver 143.

The LMU 140 can be linked to the base station 130 via a connection established between interface components 131 and 141. It has to be noted that any kind of matched interface components 131, 141 could be used, which enable a wired or wireless linking.

The cellular communication component 112 of the cellular terminal 110 and the cellular communication component 132 of the base station 130 are able to communicate with each other using a cellular link.

The GNSS receivers 113, 143 are both configured to receive, acquire and track signals transmitted by satellites S1, S2 belonging to one or more GNSSs. At least GNSS receiver 143 is further configured to decode navigation messages included in such signals.

An assisted GNSS based positioning in the system of FIG. 1 will now be described with reference to FIGS. 2 to 5.

Figure 2:
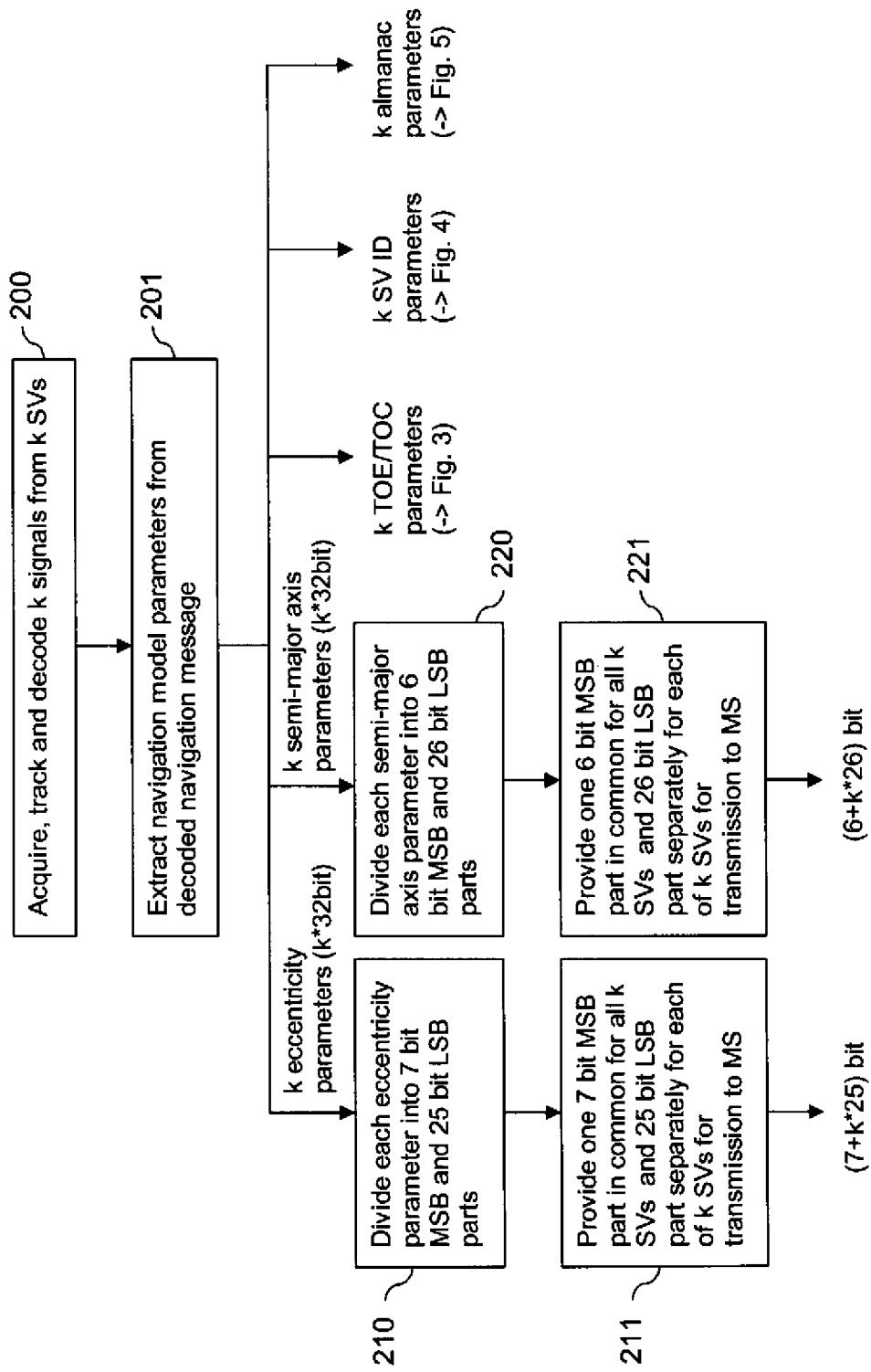
FIG. 2 is a flow chart illustrating an exemplary redundancy reduction in orbit parameters in the system of FIG. 1.

FIG. 2 is a flow chart illustrating a reduction of redundant information in orbit parameters.

GNSS receiver 143 receives, acquires, tracks and decodes signals transmitted by k satellites S1, S2 belonging to a respective GNSS (step 200). The supported GNSS signals include by way of example GPS L5, Galileo, GLONASS, SBAS and QZSS signals. The GNSS receiver 143 provides the obtained navigation messages for k signals via the interface components 141, 131 to the base station 130.

The processor 134 executes the positioning assistance software 136. It extracts various navigation model parameters from the k navigation messages, including orbit parameters, time parameters and satellite identification (SV ID) parameters (step 201). It has to be noted that the processor 134 could also receive additional GNSS related parameters, including orbit parameters of long-term orbits, from some server (not shown), which may be treated in the same manner as described below for parameters extracted from satellite signals.

The orbit for Galileo SVs, for example, is specified in the ESA document ESA-EUING-TN/10206: "Specification of Galileo and Giove Space Segment Properties Relevant for Satellite Laser Ranging", July 2006.

The orbit is specified to have a semi-major axis of 29,601,000 m and an eccentricity of 0.002. It is known from GPS that the semi-major axis of satellite orbits is very stable and does not vary much between the satellites. The GPS satellite orbits vary more specifically ±65 km around the nominal semi-major axis, which variation can be expected to be the same with Galileo.

The original Galileo format defines eccentricity and semi-major axis parameters as follows:

Eccentricity is described using a parameter of 32 bits for each satellite. The employed scale factor is $2^{-33}$. The range is then [0, 0.49999].

Moreover, the square-root of the semi-major axis of the orbit of each satellite is expressed by a parameter of 32 bits (unsigned) for each satellite. The employed scale factor is $2^{-19}$ m½. As the semi-major axis is 29,601,000 m, the resolution is in the order of 0.02 m.

Since the eccentricity actually varies between 0 and 0.002, it is not required to cover the range of [0, 0.49999] for each satellite. In the presented embodiment, each eccentricity parameter is therefore divided into an MSB part, which is the same for each satellite, and an LSB part, which is specific to each satellite (step 210).

The MSB part comprises 7 bits with a scale factor of $2^{-8}$. The range is then [0, 0.49609375]. Each LSB part comprises 25 bits with a scale factor of 233. The range is then [0, 0.0039]. Combining such an MSB part with a respective one of the LSB parts yields the original range and resolution. Actually, if assuming that the range of eccentricity is [0,0.002], then the MSBs are not needed at all as they contain only zeros always. However, it might be desirable to maintain the MSBs, since they appear in the native format and, hence, they may have some use in the future.

The processor 134 thus provides a single MSB part of 7 bits in common for all eccentricity parameters and an individual LSB part of 25 bit for each eccentricity parameter of the k considered satellites as assistance data (step 211).

According to the GPS L5 specification, for example, the semi-major axis moreover varies about 65 km around the nominal value of 29,601,000 m. Hence, the square-root of the semi-major axis is in the range of [5434.7, 5446.7]. Since the variation of the semi-major axis is only ±65000 m, it is not required to represent to whole range for each satellite. It is further assumed that the Galileo orbits behave similarly as the GPS orbits.

In the presented embodiment, also each semi-major axis parameter is therefore divided into an MSB part, which is the same for each satellite, and an LSB part, which is specific to each satellite (step 220).

When assuming that the semi-major axis varies by approximately $\Delta a = 65$ km around the nominal value of $a_0 = 29,601,000$ m, the bit representations of the upper and lower limits of the range are given by:

$$\lceil \sqrt{a_0 + \Delta a} \rceil = 5447_{10} = 1010101000111_2$$

$$\lfloor \sqrt{a_0 - \Delta a} \rfloor = 5434_{10} = 1010100111010_2$$

Hence, there are 6 common MSBs with $MSB = 101010_2 = 42_{10} * 2^7 = 5376_{10}$ for any possible value in the covered range.

The MSB part is thus selected to comprise 6 bits with a scale factor of $2^7$ m. The range is [0, 8064.00000] m½. The LSB part is selected to comprise 26 bits with a scale factor of $2^{-19}$ m. The range is [0, 127.99999] m½.

The processor 134 thus provides a single MSB part of 6 bits in common for all semi-major axis parameters and an individual LSB part of 26 bit for each semi-major axis parameter of the k considered satellites as assistance data (step 221).

The total savings in bit count for the orbit parameters that are achieved using the above approach is thus (k*32+k*32) bits−(7+k*25+6+k*26) bits=(k−1)*13 bits.

The orbit parameters from signals originating from other GNSSs satellites than Galileo satellites can be treated in a corresponding manner. It is to be understood that depending on the system, also other than eccentricity and semi-major axis parameters may be reduced to consume less bits.

Figure 3:
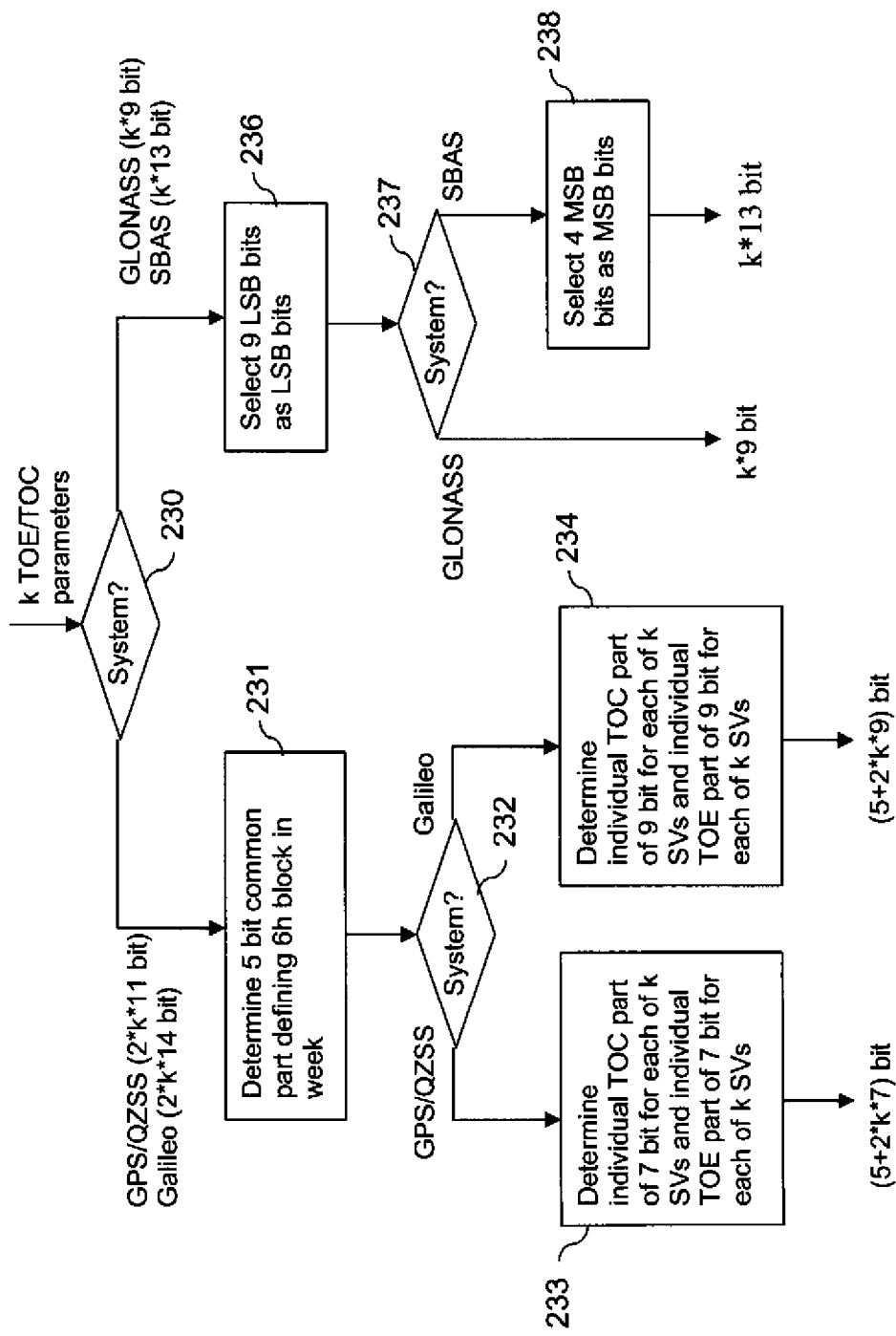
FIG. 3 is a flow chart illustrating an exemplary redundancy reduction in time parameters in the system of FIG. 1.

FIG. 3 is a flow chart illustrating a reduction of redundant information in time parameters extracted from the k decoded navigation messages.

The time parameters comprise for each system a time-of-ephemeris (TOE) and a time-of-clock-model (TOC) parameter.

Currently, the GNSSs allocate bits to these parameters as summarized in the following table:

| System | #bits in TOE/TOC | Scale of TOE/TOC |
|---|---|---|
| GPS L5 | 11/11 | 300 s/300 s |
| Galileo | 14/14 | 60 s/60 s |
| QZSS | 11/11 | 300 s/300 s |
| GLONASS | 7 + 2 | 30 min/45 min/60 min |
| SBAS | 13 | 16 s |

For the GPS L5 signal, the time keeping is based on the time-of-week (TOW). 11 bits using a scale factor of 300 s are provided for each, TOE parameter and TOC parameter.

For the Galileo signal, the time keeping is equally based on the time-of-week. In this case, 14 bits using a scale factor of 60 s are provided for each, TOE parameter and TOC parameter.

According to the L1C draft IS-GPS-800 (April 2006), the QZSS signal will be similar to the GPS signal L1C, while L1C and L5 are similar with respect to the navigation model as regards orbit model and SV clock model. Therefore, L1C, L5 and QZSS may eventually be described by the same mode in a multimode navigation model.

If these original formats are simply copied into an assistance message for transmission, bits are wasted due to included redundant data.

For example, a single Galileo satellite might provide a TOE value of 400,000 s and a TOC value of 401,800 s. In the original format, 28 bits are needed to represent this data. However, an alternative method would be to express the TOE and TOC values as "400,000+000,000" and "400,000+001,800", respectively. Thus, the TOE and TOC values have a common part "400,000" and delta-parts of "000,000" and "001,800", respectively. This consideration can be used to save bits, when the common and delta-parts are chosen appropriately. The expression delta-part is used to denote the deviation of a parameter value from a determined common value.

The same considerations apply analogously for Galileo and QZSS.

When time parameters from k satellite signals are received, it is thus first determined whether they are parameters from GPS, QZSS or Galileo signals (step 230).

If this is the case, a common part is determined (step 231). The common part is constructed by diving the week into six-hour blocks. The choice of the block length is limited by the time of applicability of the models. The block length must be the same or longer than the longest time of applicability. In the original formats, the longest time is four hours. However, because long-term orbits must be allowed for, the block length is set to 6 hours. It has to be noted, though, that the choice of length is quite arbitrary as long as it is longer than the fit interval of any original GNSS format so the selection of 6 hour blocks is only an example. Moreover, as the block length grows, the obtained bit count reduction is reduced, since the required number of bits in the delta-part grows.

In the present example, the common part is described with 5 bits using a scale factor of 6 h, which results in a range of 0-186 h. This allows representing the whole week in six-hour blocks. This common part is used in common for all TOE and TOC values in all k satellite signals.

The selection of the individual delta-parts for each satellite and each TOE and TOC value depends on the considered satellite system (step 232).

In case the considered satellite system is GPS or QZSS, the individual delta-part for each TOC value is represented by 7 bits for each of k considered satellite signals, and the individual delta-part for each TOE value is represented by additional 7 bits for each of k considered satellite signals (step 233).

A single common part and k individual delta-parts are then included in the assistance message. The total number of bits for the common part and the k individual delta-parts is thus (5+2*k*7) bits, compared to the original (2*k*11) bits.

In case the considered satellite system is Galileo, the individual delta-part for each TOC value is represented by 9 bits for each of k considered satellite signals, and the individual delta-part for each TOE value is represented by additional 9 bits for each of k considered satellite signals (step 234).

A single common part and k individual delta-parts are then included in the assistance message. The total number of bits for the common part and the k individual delta-parts is thus (5+2*k*9) bits, compared to the original (2*k*14) bits.

In all three cases, the common part is thus the same for all TOC and TOE parameters for all SVs, while the delta-part is time parameter and SV-specific. Therefore, minimizing the bit count in the delta-part minimizes the total bit consumption as well.

When time parameters from k satellite signals are received, and it is determined that they are parameters from GLONASS or SBAS signals (step 230), in contrast, no common part is used for TOE and TOC values or for different satellites.

The reason is that in these cases, the counts begin from the day change as opposed to the other systems, in which the time keeping is based on the time-of-week. Since SBAS and GLONASS count their time on a day-basis, the MSBs indicating 6 h blocks used for Galileo, GPS, QZSS etc. are useless overhead from the SBAS and GLONASS point of view. Hence, the MSBs described above are not used for SBAS and GLONASS. Instead, only LSBs are used for SBAS and GLONASS.

In the original GLONASS format, TOE and TOC are expressed by a number of blocks from the beginning of the day. The number of blocks is expressed by a value in a 7-bit field $t_b$. An additional value in a 2-bit field P1 indicates the length of the block, which may be either 30 min, 45 min or 60 min. The TOE/TOC is taken to the middle of the block. The parameter is used for TOE and TOC simultaneously, so only 7+2 bits are needed.

In the original SBAS format, the same 13 bits value is used for TOE and TOC in the WAAS with a scale factor of $2^4$ s. The count begins as well from the GPS day change.

Hence, the number of LSBs is conditional in this case. That is, they comprise 13 bit for SBAS and only 9 bit for GLONASS. The number of LSBs will thus be a function of the GNSS ID.

The bit count characteristics and scale factors for SBAS are maintained in the presented embodiment. Also the reference time for GLONASS parameters is transferred in the assistance as it is broadcasted by SVs, that is, using 7+2 bits.

The individual parts for TOE and TOC parameters of each satellite are divided in addition into LSB and MSB parts, though. These LSB and MSB parts can be considered to be sub-parts of the LSBs used for Galileo, GPS, QZSS etc.

For both systems, GLONASS and SBAS, the 9 LSBs of each parameter are provided as a respective LSB part for the assistance message (step 236).

In the case of GLONASS (step 237), only these 9 (7 bits for block count and 2 bits for the flag P1) LSB bits are used in the assistance message.

In the case of SBAS (step 237), the remaining 4 bits of the 13 bits from the original SBAS format are provided as a respective MSB part in the assistance data (step 238).

It should be kept in mind that the interpretation of the LSB-part changes depending upon whether the system is SBAS or GLONASS.

The bit savings for different GNSSs as described with reference to FIG. 3 are summarized in the following table:

| Mode | Bits | Scale factor | Range | Saving |
|---|---|---|---|---|
| GPS L5/ QZSS | 7 | 300 s | 38100 s = 10.6 h | 2 * 11 * k − (5 + 2 * 7 * k) = 8 * k − 5 bits |
| Galileo | 9 | 60 s | 30660 s = 8.5 h | 2 * 14 * k − (5 + 2 * 9 * k) = 10 * k − 5 bits |
| GLONASS/ SBAS | 9/13 | 15 min/ 16 s | 86400 s = 1 day | None |

GPS L5 and QZSS are represented by the same mode in the presented multi-mode navigation model, since the navigation models might be identical in GPS L5 and QZSS as regards orbit and time.

GLONASS and SBAS are represented by the same mode in the presented multi-mode navigation model, since the orbit models in both are based on representing the satellite position, velocity and acceleration in the earth-centered, earth-fixed (ECEF) coordinates at a given instant and then perturbing the position based on the rate-of-change information.

Figure 4:
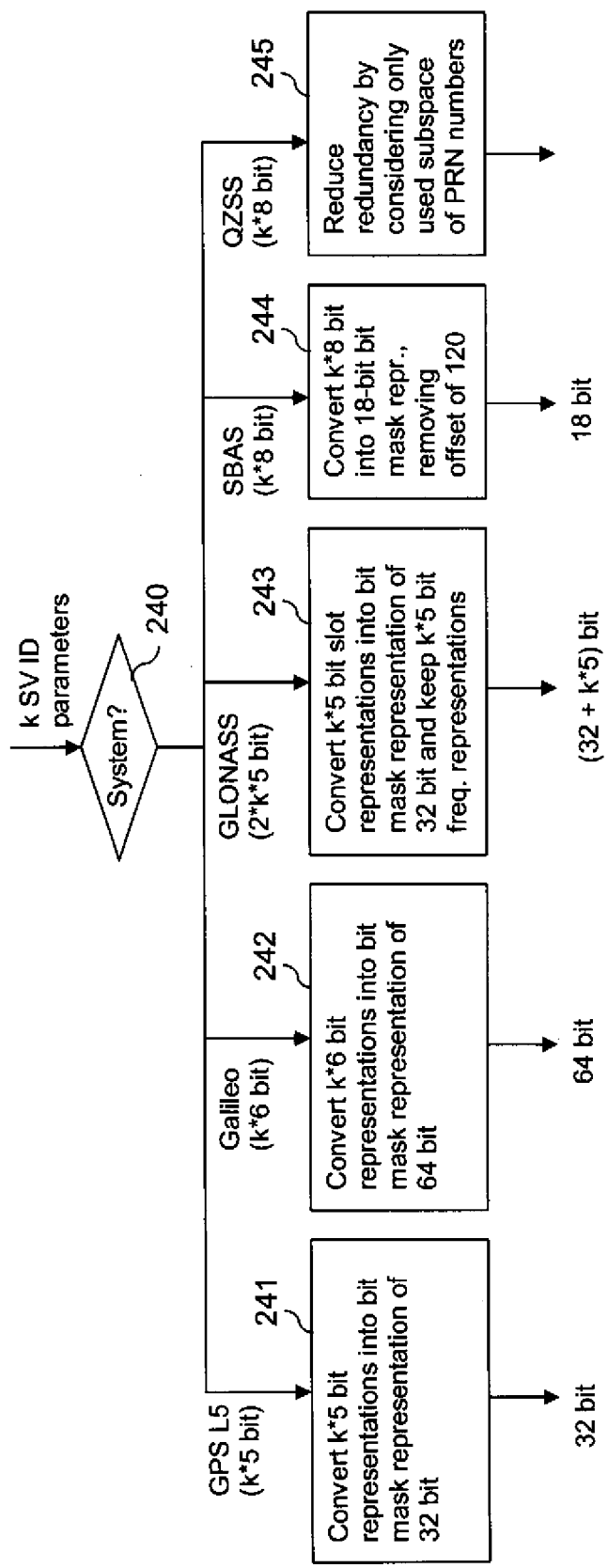
FIG. 4 is a flow chart illustrating an exemplary redundancy reduction in SV ID parameters in the system of FIG. 1.

FIG. 4 is a flow chart illustrating a reduction of redundant information in SV ID parameters extracted from k decoded navigation messages.

The bit counts required for identifying a satellite in different GNSSs are indicated in the following table:

| System | # of bits | Notes |
|---|---|---|
| GPS L5 | 5 | Range 1-32 |
| Galileo | 6 | Range 1-64 |
| GLONASS | 5 + 5 | 5 bit (1-32) for slot index, 5 bit (1-32) for frequency index |
| SBAS | 8 | Range 0-255, but only 120-138 used for WAAS/EGNOS |
| QZSS | 8 | Range 0-255, according to L1C draft |

In the case of GPS L5 signals, the satellites are identified in the original format by a 5-bit SV index, which allows identifying 32 different satellites. This consumes k*5 bits, where k is the number of identified satellites.

If assistance data is to be provided for more than 6 satellites (k>6), the k Sv indices may be presented more bit-efficiently by using a bit mask of 32 bit, in which each bit indicates whether a particular satellite signal has been tracked.

If the considered satellite system is GPS (step 240), the k*5 bit representations are thus converted into a bit mask of 32 bit (step 241).

For instance, if there are k=8 SVs {1 5 8 10 18 19 22 30}, the PRN numbers would require a bandwidth of 8*5=40 bit. When representing the SVs in contrast by the bit mask [1 0 0 0 1 0 0 1 0 1 0 0 0 0 0 0 0 1 1 0 0 1 0 0 0 0 0 0 0 1 0 0], the same information is provided by a bandwidth using 8 bit less.

In case the considered satellite system is Galileo (step 240), the same approach is applied. However, in the case of Galileo the satellites are identified in the original format by a 6-bit SV index, which allows identifying 64 different satellites. Thus, the 6-bit representation of the Galileo SV IDs for k satellite signals is converted into a bit mask of 64 bit (step 242). A bit saving is achieved, if assistance data is provided for more than ten Galileo satellite signals (k>10).

Still, at least for almanacs, it is indicated in the Galileo SIS-ICD draft 0 dated 23rd May 2006.: "Galileo Open Service Signal In Space Interface Control Document", provided by Galileo Joint Undertaking, that almanacs are sent only for 36 satellites. Therefore, with almanacs, it can be expected to be sufficient to use a 36-bit bit mask. This means, bits are saved already if assistance data is provided for more than 6 satellites (k>6).

In the original GLONASS format, 5 bits are used for a slot index identifying one of 32 orbit slots, while additional 5 bits are used for a frequency index identifying one of 32 frequencies. If the considered satellite system is GLONASS (step 240), the k*5 bit representations of the time slots are converted into a bit mask representation of 32 bits (step 243), just as in the case of GPS L5. The k frequency indices are included in the assistance message without modification.

In the case of SBAS, 8 bits are used for representing the SV IDs in the original form, but in the covered range of 0-255, only values 120-138 are used for WAAS and EGNOS. If the considered satellite system is SBAS (step 240), the k*8 bits may be represented using an 18-bit bit mask when using an offset of 120 (step 244), since the space to be described is only 18 SVs long. Bit saving is achieved, if assistance data is provided for more than 2 satellites (k>2).

In the case of QZSS, it is likely that equally only a subspace of the available PRN numbers will be used. In this case, bit saving may be achieved similarly as in the SBAS case (step 245), if the considered satellite system is QZSS (step 240).

FIG. 5 is an arrangement of tables illustrating a reduction of redundant information in almanac parameters extracted from decoded navigation messages.

It is assumed by way of example that the decoded navigation messages are from Galileo and GLONASS satellites.

The almanac parameters comprise a plurality of parameters, including a reference time for the almanac. In the case of Galileo, the reference time is composed of the Galileo week and time-of-week as specified in the above mentioned Galileo SIS-ICD draft. In the case of GLONASS, the reference time is described by two parameters, namely a day count from the 1st January of the last leap year and in addition the time of day (Toa), as described in the GLONASS ICD, version 5.0, Moscow 2002, by the Coordination Scientific Information Center of the Russian Ministry of Defense.

For achieving a redundancy reduction, for GLONASS the day count from the 1st January of the last leap year is first substituted by a week count corresponding to the Galileo week count, and a day count from the beginning of the week. The time of day (Toa) is maintained as described in the GLONASS ICD.

Now, the "week" count of 8 bit can be used in common for the Galileo almanac data and the GLONASS almanac data. No scaling is used for the representation of the week. This is indicated in the first table of FIG. 5.

In addition, an own common part is provided for Galileo, which includes the Issue of Data (IODa) with 2 bits without scaling and a time-of-week (Toa) with 8 bits and a scaling of $2^{12}$ seconds. The IODa is a running number describing the data set version. This is indicated in the second table of FIG. 5.

The actual almanac data is provided separately in an individual part for each considered Galileo satellite. This is indicated in the third table of FIG. 5. The included parameters are not mentioned in detail. They are described in the above mentioned Galileo SIS-ICD draft. It is to be understood, however, that reduction schemes corresponding to those presented with reference to FIGS. 2-4 for ephemeris parameters can be used as well for the almanac parameters for any further reduction of redundancy.

For GLONASS, no own common part or an empty common part is provided. This is indicated in the fourth table of FIG. 5.

The day count (day) and the time of day (Toa) are provided instead together with the actual almanac data separately in an individual part for each considered GLONASS satellite. This is indicated in the fifth table of FIG. 5. The other included parameters are not mentioned in detail. They are described in the above mentioned GLONASS ICD. Again, it is to be understood that reduction schemes corresponding to those presented with reference to FIGS. 2-4 for ephemeris parameters can be used as well for the almanac parameters.

For completeness, it may be noted that in general, Toa is a term meaning "Time-of-Almanac". With Galileo this is originally "Time-of-Week" (plus week count), since Galileo time keeping is based on counting weeks and counting time in blocks of one week. On the other hand, with GLONASS "Toa" is originally the count of days from the beginning of the latest leap year and then counting time inside that day. So depending upon the GNSS, the interpretation of "Time-Of-Almanac" changes.

It is to be understood that the same distribution to common part and individual parts could be used, if only Galileo signals or only GLONASS signals are considered.

It is to be understood that alternatively, a common part could be determined separately for each satellite system.

Further, a similar split into a common part and an individual part of almanac parameters could be realized for other GNSSs.

Moreover, the presented division into common and individual parts is to be understood only as an exemplary embodiment. For instance, in an alternative embodiment, the "day" parameter in GLONASS could be taken to the common part of GLONASS satellites.

The entirety of the parameters resulting in the operations of FIGS. 2-5 has thus a reduced redundancy. They are inserted together with other data extracted from the k navigation messages in an assistance message that is transmitted by the base station 130 via a cellular link to the cellular terminal 110. In the cellular terminal 110, the received assistance message is provided to the processor 114.

The processor 114 executes the assisted positioning software 116. It receives measurement results from the GNSS receiver 113 for a plurality of acquired and tracked satellite signals, but possibly no decoded navigation data. The associated navigation data that is required for a positioning of the cellular terminal 110 is obtained from the assistance data, for example in order to accelerate the positioning or in order to enable a positioning in those cases, in which is it not possible to decode the navigation messages in acquired and tracked satellite signals.

Figure 6:
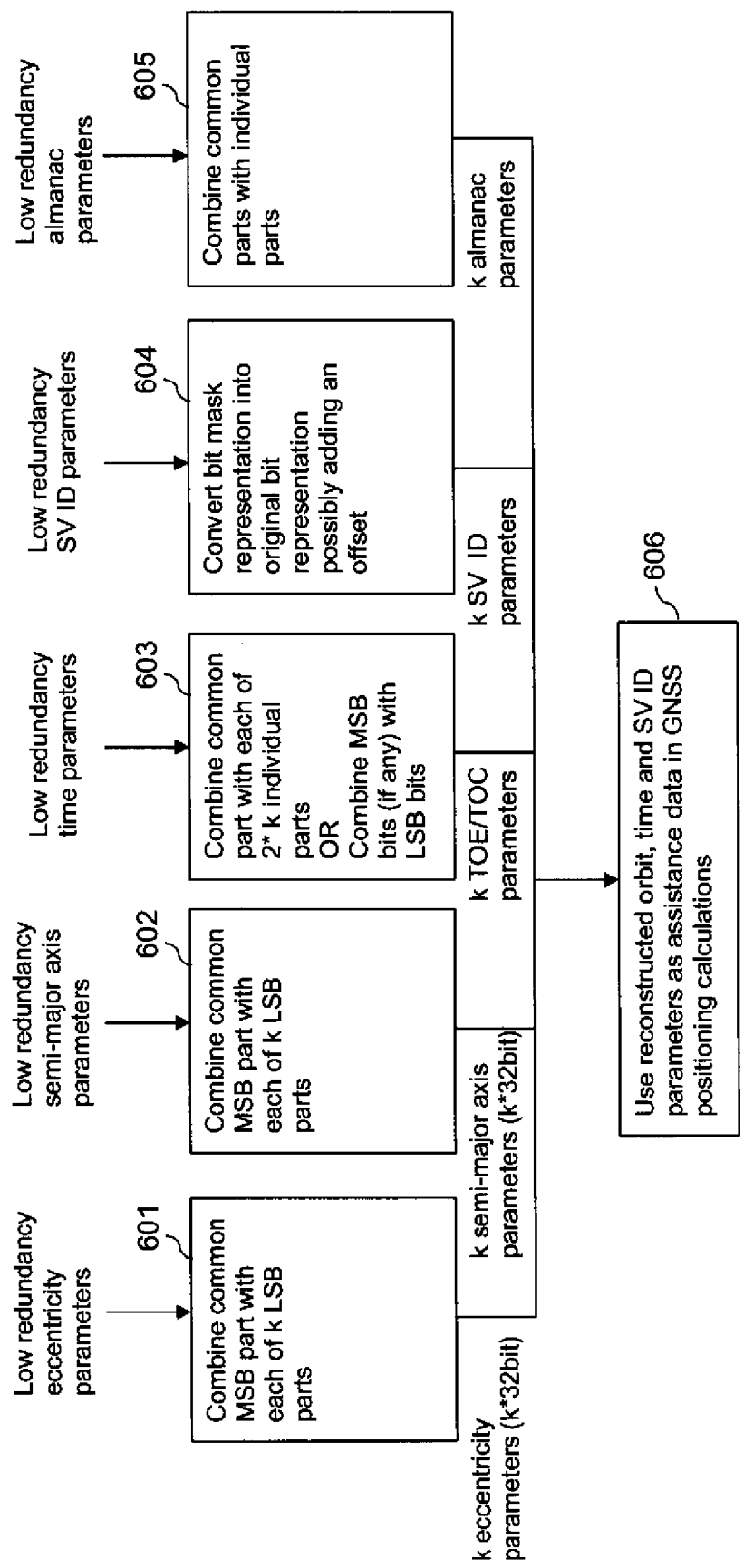
FIG. 6 is a flow chart illustrating an exemplary redundancy regaining in navigation model parameters in the system of FIG. 1.

FIG. 6 is a flow chart illustrating a reconstruction of the original navigation orbit parameters from the parameters in the received assistance message.

The processor 114 extracts from the assistance message the low redundancy eccentricity parameters and combines for each of k satellite signals the common 5 bit MSB part with the respective individual 25 bit LSB part (step 601). The resulting values are identical to the original k*32 bit eccentricity parameters.

The processor 114 further extracts from the assistance message the low redundancy semi-major axis parameters and combines for each of k satellite signals the common 6 bit MSB part with the respective individual 26 bit LSB part (step 602). The resulting values are identical to the original k*32 bit semi-major axis parameters.

The processor 114 further extracts from the assistance message the time parameters, which may or may not have a reduced redundancy compared to the original time parameters. Depending on the considered satellite system, the processor 114 combines an extracted common part with each of 2*k extracted individual parts, or it combines extracted MSBs (if any), with extracted LSBs (step 603). The combining includes a reversal of any change of scale factor that has been carried out in the base station 130. The resulting values are identical to the original k TOE/TOC parameters.

The processor 114 further extracts from the assistance message the low redundancy SV ID parameters. Depending on the considered satellite system, it converts the obtained bit mask representation into the k bit representations. In case an offset had been removed from the k original bit representations before the conversion to a bit-mask representation, the predetermined offset is now added again to each of the k bit representations, in order to obtain the original bit count (step 604). The results are then identical to the original k SV ID parameters.

The processor 114 further extracts from the assistance message the low redundancy almanac parameters. It combines the common part with each of the individual parts (step 605). If the almanac parameters are provided for Galileo and GLONASS, for example, a common part indicating the week count for both is combined with the common part for Galileo indicating the time-of-week. This combined common part is then further combined with each individual almanac part for a respective Galileo satellite. In addition, the common part for Galileo and GLONASS indicating the week count is converted into a count of day and combined with the count of day and the time of day information in each individual almanac part for a respective GLONASS satellite. The resulting parameters are thus identical to the original sets of almanac parameters.

The regained original orbit, time and SV ID parameters are then used with any other assistance data extracted from the assistance message in conventional positioning calculations (step 606).

On the whole, it becomes apparent that the bandwidth required for transmitting the assistance data from the base station 130 to the cellular terminal 110 can be reduced significantly by removing redundancies from the parameters extracted from the navigation messages. Nevertheless, the original parameters can be regained at the cellular terminal 110 without losing precision or compatibility with the original format.

Figure 7:
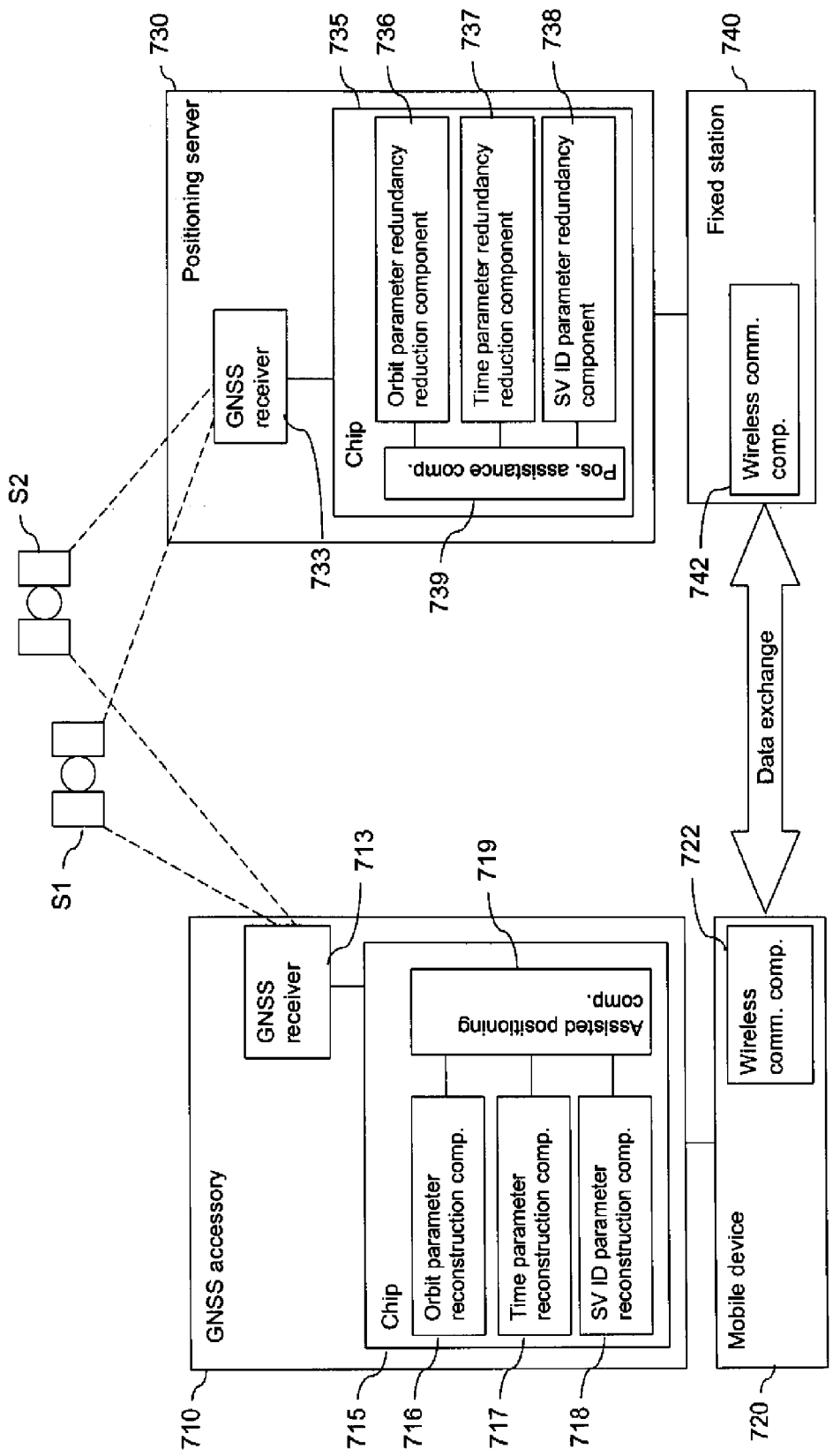
FIG. 7 is a schematic diagram of a second system according to an embodiment of the invention.

FIG. 7 presents another exemplary system according to the invention, which uses a reduced bandwidth for transferring assistance data for an AGNSS based positioning on a wireless link.

The system comprises a mobile device 720, a GNSS accessory device 710, a positioning server 730 of a wireless communication network and a fixed station 740 of a wireless communication network.

The mobile device 710 comprises a wireless communication component 722. The wireless communication component 722 can be for instance a cellular engine or terminal, or a WLAN engine or terminal, etc.

The GNSS accessory device 720 comprises a chip 715 and, linked to this chip 715, a GNSS receiver 713. The chip 715 can be for instance an integrated circuit (IC), which includes circuitry configured to realize an assisted positioning. In addition to the actual assisted positioning component 719, which may be implemented in a conventional way, the circuitry includes an orbit parameter reconstruction component 716, a time parameter reconstruction component 717 and an SV ID parameter reconstruction component 718.

Mobile device 710 and GNSS accessory device 720 comprise matching interfaces (not shown), which enable a data exchange via a wireless or wired link between both devices.

The fixed station 740 includes a wireless communication component 742, which allows establishing a wireless link to the wireless communication component 722 of the mobile device 720. The wireless link may be a cellular link or a non-cellular link, like a wireless local area network (LAN) connection.

The positioning server 730 comprises a chip 735 and, linked to this chip 735, a GNSS receiver 733. The chip 735 can be for instance an integrated circuit (IC), which includes circuitry configured to assemble an assistance message for an assisted positioning. The circuitry comprises in addition to the actual assistance message assembly component 739 an orbit parameter redundancy reduction component 736, a time parameter redundancy reduction component 737 and an SV ID parameter redundancy reduction component 738.

Fixed station 740 and positioning server 730 comprise matching interfaces (not shown), which enable a direct or indirect data exchange via a wireless or wired link between both devices.

The GNSS receivers 713, 733 are both configured to receive, acquire and track signals transmitted by satellites S1, S2 belonging to one or more GNSSs, for example including GPS L5, Galileo, GLONASS, SBAS and QZSS signals. At least GNSS receiver 733 is further configured to decode navigation messages included in such signals.

An assisted positioning operation in the system of FIG. 7 can be realized in a corresponding manner as described for the system of FIG. 1 with reference to FIGS. 2 to 6. In this case, the chip 735 takes care of the functions of processor 134, while the chip 715 takes care of the functions of processor 114.

Base station 130 or network element 730 could be an exemplary electronic device according to the first considered aspect. Processor 134 or chip 735 could be an exemplary apparatus according to the first considered aspect. Cellular terminal 110 or GNSS accessory 710 could be an exemplary electronic device according to the second considered aspect. Processor 114 or chip 715 could be an exemplary apparatus according to the second considered aspect.

The functions illustrated by the processor 134 executing software 136 or the functions illustrated by the chip 735 can also be viewed as means for receiving parameters, which have been extracted from at least one satellite signal, as means for removing redundant information from the parameters at large, and as means for providing parameters with reduced redundancy as assistance data for a satellite signal based positioning.

The functions illustrated by the processor 114 executing software 116 or the functions illustrated by the chip 715 can also be viewed as means for receiving parameters as assistance data for a satellite signal based positioning, wherein the received parameters are based on original parameters extracted from at least one satellite signal, from which original parameters at large redundant information has been removed, as means for reconstructing the original parameters by adding the removed redundant information to the received parameters, and as means for using the reconstructed original parameters in an assisted satellite signal based positioning.

Furthermore, the claimed means-plus-function clauses are intended to cover the structures described herein as performing the recited function and not only structural equivalents, but also equivalent structures.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. Just to give one example, the indicated bit counts for MSB and LSB parts and the indicated scale factors can obviously be changed in any suitable manner. Further, the presented embodiments can be adapted as required for use with any other, including any future, GNSSs. It is the intention, therefore, to be limited only as indicated by the scope of the claims appended hereto.

What is claimed is:

1. A method comprising:
   assembling, by an apparatus, a set of parameters for a plurality of satellites belonging to at least two different satellite systems;
   including in said set of parameters for each of said satellites of said at least two different satellite systems a respective individual part for at least one parameter, wherein said individual part is valid only for a respective one of said satellites and wherein said individual part comprises at least one of: almanac data for said respective satellite and non-immediate information for said respective satellite;
   including in said set of parameters a common part for at least one parameter, wherein said common part is valid for each of said satellites belonging to at least one of said at least two different satellite systems, wherein said common part comprises a week count and a time of week as parts of reference time information that is provided specifically for at least one of almanac data and non-immediate information, and wherein said parts of reference time information are excluded from the respective individual part for the satellites belonging to said at least one of said at least two different satellite systems; and
   directing transmission, by said apparatus, of said assembled set of parameters in a message to a device as assistance data for a global navigation satellite system based positioning.

2. The method according to claim 1, further comprising including in said set of parameters at least one of:
   a satellite index for each satellite of said plurality of satellites; and
   an identifier of an employed data structure for each satellite of said plurality of satellites.

3. The method according to claim 1, wherein said common part is valid for each of said satellites belonging to at least two of said at least two different satellite systems.

4. The method according to claim 1, wherein said common part, which is valid for each of said satellites belonging to at least one of said at least two satellite systems, comprises in addition at least one of:
   an issue-of-data indication; and
   a day count.

5. An apparatus comprising a processor and a memory including computer program code, the memory and the computer program code configured to, with the processor, cause the apparatus at least to perform:
   assemble a set of parameters for a plurality of satellites belonging to at least two different satellite systems;
   include for said assembling in said set of parameters for each of said satellites of said at least two different satellite systems a respective individual part for at least one parameter, wherein said individual part is valid only for a respective one of said satellites and wherein said individual part comprises at least one of: almanac data for said respective satellite and non-immediate information for said respective satellite;
   include for said assembling in said set of parameters a common part for at least one parameter, wherein said common part is valid for each of said satellites belonging to at least one of said at least two different satellite systems, wherein said common part comprises a week count and a time of week as parts of reference time information that is provided specifically for at least one of almanac data and non-immediate information, and wherein said parts of reference time information are excluded from the respective individual part for the satellites belonging to said at least one of said at least two different satellite systems; and
   enable provision of said assembled set of parameters in a message to a device as assistance data for a global navigation satellite system based positioning.

6. The apparatus according to claim 5, wherein the memory and the computer program code are further configured to, with the processor, cause the apparatus to include in said set of parameters at least one of:
- a satellite index for each satellite of said plurality of satellites; and
- an identifier of an employed data structure for each satellite of said plurality of satellites.

7. The apparatus according to claim 5, wherein said common part is valid for each of said satellites belonging to at least two of said at least two different satellite systems.

8. The apparatus according to claim 5, wherein said week count is valid for each of said satellites belonging to at least two of said at least two different satellite systems.

9. The apparatus according to claim 5, wherein the memory and the computer program code are further configured to, with the processor, cause the apparatus to include in said set of parameters a second common part for at least one parameter, wherein said second common part is valid only for each of said satellites belonging to a respective one of said at least two satellite systems.

10. The apparatus according to claim 5, wherein the memory and the computer program code are further configured to, with the processor, cause the apparatus to include in said common part, which is valid for each of said satellites belonging to at least one of said at least two satellite systems, in addition at least one of:
- an issue-of-data indication; and
- a day count.

11. The apparatus according to claim 5, wherein the memory and the computer program code are further configured to, with the processor, cause the apparatus to include in the individual part, which is valid only for a respective one of said satellites of at least two different satellite systems, at least one of:
- a day count; and
- a time of day.

12. The apparatus according to claim 5, wherein the memory and the computer program code are further configured to, with the processor, cause the apparatus to provide said assistance data for transmission via a wireless link to the device, wherein the device is a wireless terminal to which a satellite signal receiver is associated.

13. The apparatus according to claim 5, further comprising at least one of:
- a wireless communication component configured to transmit information via a wireless link; and
- a satellite signal receiver.

14. A system comprising:
an apparatus according to claim 5; and
an apparatus configured to use an assembled set of parameters in satellite based positioning calculations.

15. A computer program product, in which a computer program code is stored in a non-transitory computer readable medium, said computer program code configured to cause an apparatus to realize the method of claim 1 when executed by a processor.

16. The computer program product according to claim 15, wherein said computer program code is configured to include in said common part, which is valid for each of said satellites belonging to at least one of said at least two satellite systems, in addition at least one of:
- an issue-of-data indication; and
- a day count.

17. The apparatus according to claim 5, wherein the memory and the computer program code are further configured to, with the processor, cause the apparatus to include in said common part, which is valid for each of said satellites belonging to at least one of said at least two satellite systems, in addition an issue-of-data indication.

18. The apparatus according to claim 5, wherein the apparatus is one of a base station of a cellular communication network or a positioning server.

19. The method according to claim 1, wherein said message is defined at least for a Global Positioning System (GPS), a Quasi-Zenith Satellite System (QZSS), a Global Navigation Satellite System (GLONASS) and a Space Based Augmentation System (SBAS).

20. The apparatus according to claim 5, wherein said message is defined at least for a Global Positioning System (GPS), a Quasi-Zenith Satellite System (QZSS), a Global Navigation Satellite System (GLONASS) and a Space Based Augmentation System (SBAS).

* * * * *

UNITED STATES PATENT AND TRADEMARK OFFICE
CERTIFICATE OF CORRECTION

PATENT NO.        : 8,624,778 B2                                          Page 1 of 1
APPLICATION NO.  : 12/442401
DATED             : January 7, 2014
INVENTOR(S)       : Syrjarinne et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 631 days.

Signed and Sealed this

Twenty-second Day of September, 2015

Michelle K. Lee
*Director of the United States Patent and Trademark Office*